United States Patent [19]

Barenthsen

[11] Patent Number: 5,119,931
[45] Date of Patent: Jun. 9, 1992

[54] FLEXIBLE JOINT FOR AUGERS

[75] Inventor: Roger S. Barenthsen, West Fargo, N. Dak.

[73] Assignee: Alloway Manufacturing, Fargo, N. Dak.

[21] Appl. No.: 698,891

[22] Filed: May 13, 1991

[51] Int. Cl.⁵ .............................................. B65G 33/26
[52] U.S. Cl. .................................... 198/659; 198/668
[58] Field of Search .................................. 198/659, 668

[56] References Cited

U.S. PATENT DOCUMENTS

| 2,045,757 | 6/1936 | Constantin | 198/659 |
| 3,092,241 | 6/1963 | Dubie | 198/659 |

FOREIGN PATENT DOCUMENTS 1454767  1/1989  U.S.S.R. ............................ 198/668

OTHER PUBLICATIONS

Copy (9 pages) drawings and written material on a current design of a U-joint and hopper assembly Jan. 19, 1987.
Copy 1 page blueprint page showing a U-joint operation and dated Jan. 20, 1987.
Photographs (3) in color showing the U-joint, auger and one showing the joint between helicoids.
Copy—1 sheet drawing of a U-joint and auger showing an old method used.

*Primary Examiner*—Joseph E. Valenza
*Attorney, Agent, or Firm*—Henderson & Sturm

[57] ABSTRACT

An auger apparatus having a first housing for receiving and holding material to be moved has a first auger disposed therein and rotatable about a first axis for moving material within the first housing. A second housing is connected to the first housing and has a second auger disposed therein and rotatable about a second axis for moving material within the second housing, the second axis being disposed at an obtuse angle with respect to the first axis. A flexible joint is attached at one end thereof to the first auger and at the other end thereof to the second auger for transmitting rotational forces from one to the other and thereby forming a flexible joint between the two augers. Helical flighting extensions are attached to each end of the flexible joint and serve as extensions to the flighting of the first and second augers so that there is essentially a continuous flighting across the flexible joint.

6 Claims, 1 Drawing Sheet

FLEXIBLE JOINT FOR AUGERS

TECHNICAL FIELD

The present invention relates generally to augers for moving powdery, granular or pelletized materials and more particularly to a flexible joint for connecting two such augers together, for example to move materials up or down.

BACKGROUND ART

Augers of a type having a straight shaft rotated about an axis and having a helical flighting thereon are commonly used to move powdery, granular or pelletized material, for example on the farm to move grain, such as corn or wheat and animal feeds which essentially are made of ground up grain with or without additives and which are sometimes pelletized. There are of course many industrial uses for augers such as to move materials from one place to another.

Because it is not always possible to move materials in a straight line, it is often necessary to connect more than one auger together by the use of U-joints to change directions, for example to go from a lower level to an upper level. There are many problems, however, associated with the use of U-joints in augers. For example, it is not possible to connect an auger flighting onto U-joints because they have parts which pivot with respect to each other and because the U-joints themselves are rather bulky. This creates a situation which requires that the material from one straight section of auger connected to another straight section of auger at an angle requires pushing the material through and past a bulky universal joint. This, of course, slows down the process of moving material, reduces the capacity of the auger as compared to straight auger sections and consequently is less efficient and uses more power. In essence, a U-joint creates a bottleneck in the augering process.

Additionally, while the U-joint is being driven on one end, the opposite or driven end of the U-joint is running at various speeds or velocities depending on the angle at which the U-joint is operated. For instance, for the first 90° of rotation the joint is accelerating and from 90° to 180° it is decelerating. The joint will continue to accelerate and decelerate every 90° thereafter. The amount of acceleration and deceleration is dependent upon the angle at which the U-joint is operated. This acceleration and deceleration causes many failures between the U-joint and the shaft the U-joint is driving.

Another problem is that the bearings of U-joints tend to wear out fairly frequently because of the stress thereon. Furthermore, these bearings may need to be lubricated frequently to enhance the life thereof and these lubricants tend to get into the material being conveyed, which in some cases is intolerable and, in almost all cases, is undesirable.

Furthermore, the angle of change between two straight augers is severely limited by universal joints of a conventional design. Quite often it is necessary to use two or more universal joints to achieve a desired angle of change and for each universal joint needed, the aforementioned problems are multiplied and exacerbated.

Consequently, there is a need for a universal joint for augers which will overcome the aforementioned problems.

DISCLOSURE OF THE INVENTION

The present invention relates generally to an auger apparatus having a first housing for receiving and holding material to be moved and having a first auger disposed therein and rotatable about a first axis for moving material within the first housing. A second housing is connected to the first housing and has a second auger disposed therein and rotatable about a second axis for moving material within the second housing, the second axis being disposed at an obtuse angle with respect to the first axis. A flexible joint is attached at one end thereof to the first auger and at the other end thereof to the second auger for transmitting rotational forces from one to the other and thereby forming a flexible joint between the two augers. Helical flighting extensions are attached to each end of the flexible joint and serve as extensions to the flighting of the first and second augers so that there is essentially a continuous flighting across the flexible joint.

An object of the present invention is to provide an improved universal joint for augers.

Another object of the present invention is to provide a flexible joint for connecting two straight augers together.

A further object of the present invention is to provide a flexible joint for augers which permits flighting to be disposed radially outwardly thereof which tends to create an almost continuous flighting arrangement from one auger to another across a flexible joint.

A still further object of the present invention is to provide a joint for augers which is more efficient and which does not significantly reduce the auger capacity.

A still further object of the present invention is to provide a bearing-less universal joint for connecting two augers together.

A still further object of the present invention is to provide a joint where a first auger rotates radially at the same velocity as the rotational velocity of a second auger to which it is attached.

Other objects, advantages, and novel features of the present invention will become apparent from the following detailed description of the invention when considered in conjunction with the accompanying drawings.

BEST MODE FOR CARRYING OUT THE INVENTION

Figure 1:
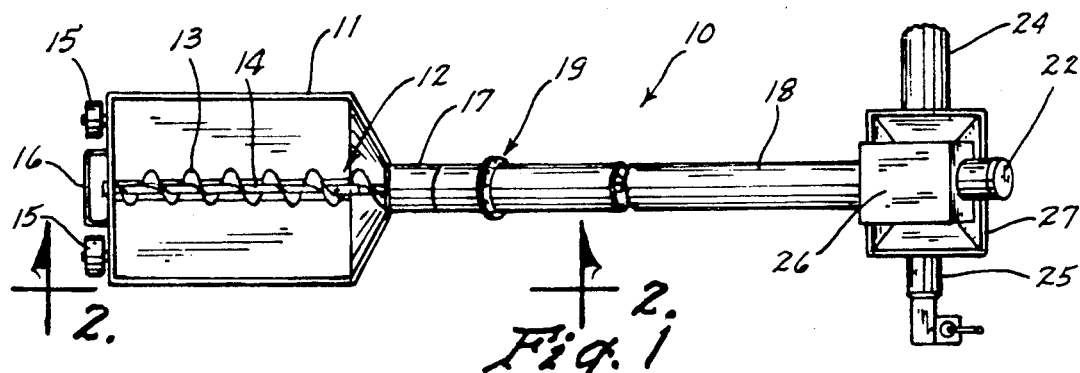
FIG. 1 is a top plan view of an auger apparatus constructed in accordance with the present invention.

Referring now to the drawings wherein like reference numerals designate identical or corresponding parts throughout the several views, FIG. 1 shows an auger apparatus (10) constructed in accordance with the present invention.

Figure 2:
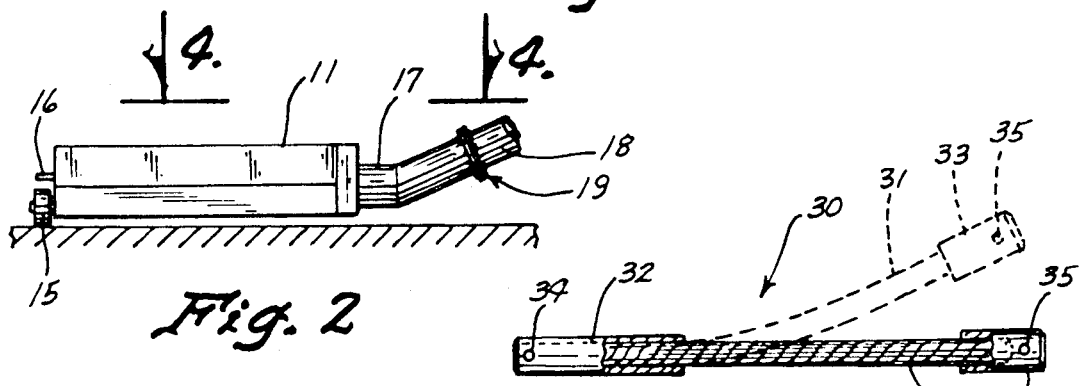
FIG. 2 is a side elevational view of a portion of the auger apparatus shown in FIG. 1.

FIGS. 1 and 2 show a hopper housing (11) for receiving material such as grain or the like and having a first auger (12) rotatably disposed therein and having a helical flighting (13) rigidly connected to a shaft (14). The first auger (12) is mounted so that it can rotate about the longitudinal axis of the shaft (14). The hopper (11) is mounted on wheels (15) so that it can be easily moved around by grasping a handle (16). The hopper housing (11) includes a transition hopper (17) which is connected to an upper housing (18) by a flange connection (19).

A second auger (20) is disposed within the second housing (18) and includes a shaft (21) which is rotatable by a motor (22) shown in FIG. 1. Flighting (23) is rigidly attached to the shaft (21) as is conventional in the auger art. The upper portion of the auger apparatus (10) can have still another housing (24) with another auger (not shown) therein and turned by another motor (25). A discharge device (26) can dump material into a hopper (27) and this material in hopper (27) is moved by the auger which extends therebelow and through housing (24).

Figure 3:
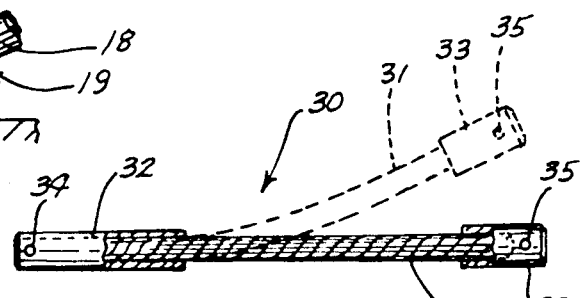
FIG. 3 is a side elevational view of a flexible joint for the auger shown in FIG. 1 which is shown in solid lines in a straight condition and in dashed lines to show that it is flexible.
Figure 4:
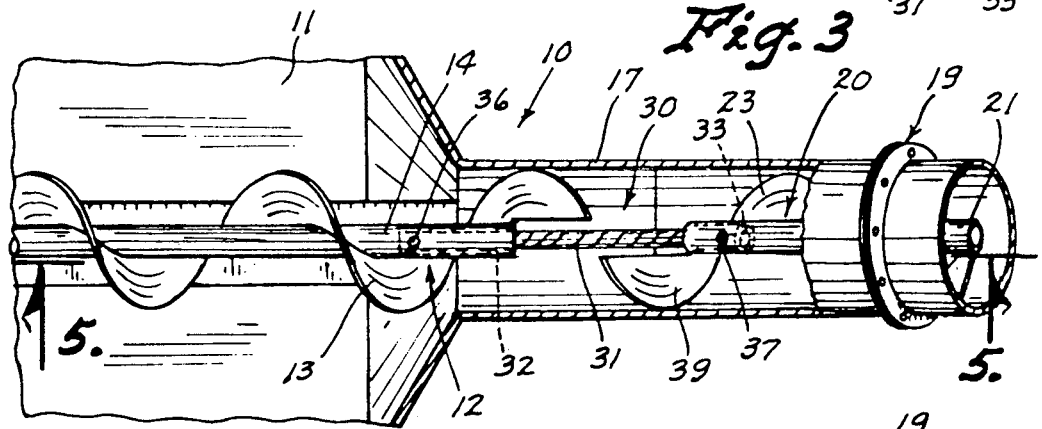
FIG. 4 is an enlarged partial cross-sectional view taken along line 4—4 of FIG. 2.
Figure 5:
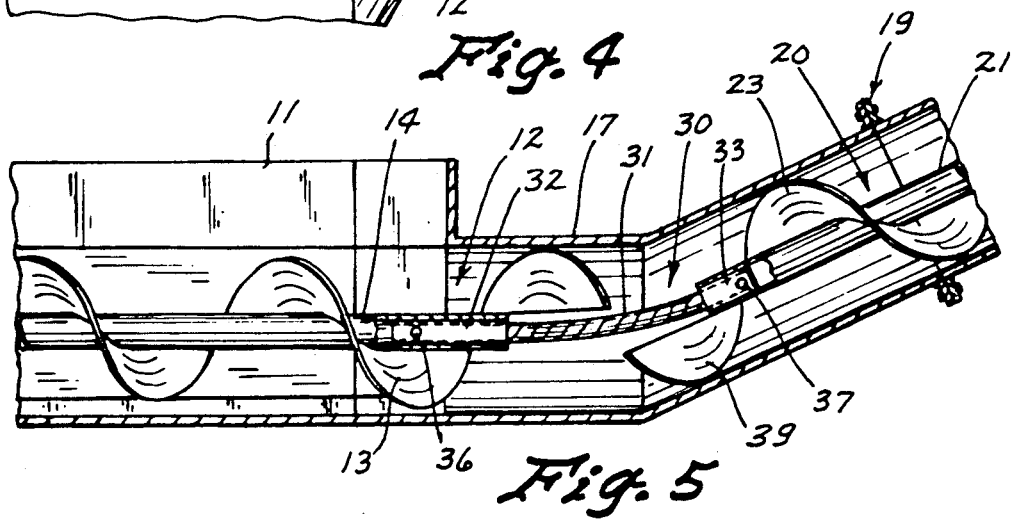
FIG. 5 is a cross-sectional view taken along line 5—5 of FIG. 4.

Referring now to FIGS. 3, 4 and 5, it is noted that a flexible joint (30) is utilized to connect the auger (12) to the auger (20). This flexible joint (30) is comprised of a metal cable (31) having a plurality of strands of metal woven together like a rope. The ends of the cable (31) have metal caps (32 and 33) rigidly attached thereto, such as by welding or the like. These caps (32 and 33) have holes (34 and 35) disposed therethrough. The cap (32) extends into the hollow shaft (14), as is shown in FIG. 5, and a pin (36) extends through the hole (34) and through aligned holes in the ends of the hollow shaft (14). This positively attaches the flexible joint (30) to the shaft (14) such that rotation of one will be transmitted to the other.

Similarly, the cap (33) is disposed inside the hollow shaft (21) of the second auger (20) and a pin (37) extends through the hole (35) in cap (33) and through aligned openings in the hollow shaft (21) so that any rotational forces imparted to either shaft (21) or joint (30) will be imparted to the other. The pins (36 and 37) can be of a type commonly referred to as roll pins which frictionally engage the caps (32 and 33) and the shafts (14) and (21), respectively.

A flighting (38) is connected to the flighting (13) and operates as an extension thereof into the transition housing (17). Extension flighting (39) is an extension of and is connected to the flighting (23) and extends into the transition housing (17) across the other half of the flexible joint (30).

In operation, as the motor (22) turns the auger (20), this force will be transmitted through the flexible joint (30) to also rotate the auger (14), which will move material from the hopper (11), by flighting (13) to the flighting section (38) across half of the flexible joint (30). The flighting (39) will then pick up the grain and transmit it to the flighting (23) of auger (20) and ultimately the material will be transmitted to the top of housing (18) and drop out the discharge on the bottom of (26) and into hopper (27), whereupon it can then be moved by motor (25) and the auger within housing (24) and hopper (27) to wherever it is desired to be transported.

Accordingly, it will be appreciated that the preferred embodiment disclosed herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:
1. Auger apparatus comprising:
   a first rigid housing means for receiving and holding granular material;
   a first auger means disposed in said first rigid housing and rotatable about a first axis for moving granular material within said first housing;
   a second rigid housing means immovably connected to said first rigid housing for receiving and holding granular material;
   a second auger means disposed in said second housing and rotatable about a second axis for moving granular material within said second housing, said second axis being disposed at an obtuse angle with respect to aid first axis;
   a flexible joint means at the vertex of the rigid housing means, and comprising an elongated metal cable attached at one end to a first cap connected to said first auger means and at the other end thereof to a second cap connected to said second auger means for transmitting rotational forces from ore of said first auger means to the other of said second auger means;
   a first at least partially helical extension flighting disposed in said first rigid housing means and attached to said first auger means for rotating therewith and extending both radially outwardly and projecting over at least a substantial portion of the elongated metal cable of the flexible joint means thereby moving granular material over said flexible joint means during rotation thereof; and
   a second at least partially helical extension flighting disposed in said second rigid housing means and attached to said second auger means for rotating therewith and extending both radially outwardly and projecting over at least a substantial portion of the elongated metal cable of the flexible joint means and toward said first helical extension flighting thereby moving granular material over said flexible joint means during rotation thereof.

2. The apparatus of claim 1 wherein said first extension flighting is an extension of and is connected at one end thereof to flighting disposed on said first auger means.

3. The apparatus of claim 2 wherein said second extension flighting is an extension of and is connected at one end thereof to flighting disposed on said second auger means.

4. The apparatus of claim 3 wherein said first extension flighting is disposed on one side of said flexible joint means and said second extension flighting is disposed on the other side of said flexible joint means.

5. The apparatus of claim 4 wherein the other end of said first extension flighting extends to one point on the length of said flexible joint means and the other end of said second extension flighting is disposed adjacent to said one point on the length of said flexible joint whereby there is very little, if any, longitudinal space between said first and second extension flightings.

6. The apparatus of claim 1 wherein each of said first and second caps having a hole disposed therein, said first cap being disposed in an opening in the end of said first auger means and said second cap being disposed in an opening in said second auger means, and first pin means extending into the hole in said first cap and into a hole in said first auger means for holding said first cap against relative rotation with respect to said first auger means and second pin means extending into the hole in said second cap and into a hole in said second auger means for holding said second cap against.

* * * * *